(12) United States Patent
Vadlamani et al.

(10) Patent No.: US 11,102,987 B2
(45) Date of Patent: Aug. 31, 2021

(54) GLUTEN-FREE COMPOSITIONS AND METHODS FOR PRODUCING SHELF-STABLE BAKERY PRODUCTS

(71) Applicant: Campbell Soup Company, Camden, NJ (US)

(72) Inventors: Keswara Rao Vadlamani, Marlton, NJ (US); Maia Ketola Lapic, Collingswood, NJ (US)

(73) Assignee: Campbell Soup Company, Camden, NJ (US)

( * ) Notice: Subject to any disclaimer, the term of this patent is extended or adjusted under 35 U.S.C. 154(b) by 76 days.

(21) Appl. No.: 15/791,631

(22) Filed: Oct. 24, 2017

(65) Prior Publication Data

US 2018/0116231 A1 May 3, 2018

Related U.S. Application Data

(60) Provisional application No. 62/414,056, filed on Oct. 28, 2016.

(51) Int. Cl.
*A21D 13/066* (2017.01)
*A21D 2/18* (2006.01)
(Continued)

(52) U.S. Cl.
CPC ........... *A21D 13/066* (2013.01); *A21D 2/186* (2013.01); *A21D 8/06* (2013.01); *A21D 10/002* (2013.01);
(Continued)

(58) Field of Classification Search
None
See application file for complete search history.

(56) References Cited

U.S. PATENT DOCUMENTS 4,608,265 A * 8/1986 Zwiercan ............... A23C 20/00
426/582
5,955,123 A 9/1999 Daggy
(Continued)

FOREIGN PATENT DOCUMENTS

EP 872188 10/1998
WO 2006107809 10/2006
(Continued)

OTHER PUBLICATIONS

Thomson, Comparison of the Starches From Barley and Malted Barley, J. Inst. Brew., vol. 65, 1959, See Table 1 on p. 350 (Year: 1959).*

(Continued)

*Primary Examiner* — Donald R Spamer
*Assistant Examiner* — Philip A Dubois
(74) *Attorney, Agent, or Firm* — Pauly, DeVries Smith & Deffner LLC

(57) ABSTRACT

Embodiments herein include gluten-free baked products such as crackers, gluten-free flour formulations, and related methods. In an embodiment, a cracker flour substitute composition is included having a starch blend including a native starch with 20-30% amylose content, a cross-linked starch and a pre-gelatinized starch with 1-5% amylose content. The composition can include between 0 and 20 ppm gluten. In an embodiment, a shelf-stable baked cracker is included. The shelf-stable baked cracker can include a flour substitute composition including a starch blend having a native starch with 20-30% amylose content, a cross-linked starch, and a pre-gelatinized starch with 1-5% amylose content. The composition can include between 0 and 20 ppm gluten. Other embodiments are also included herein.

3 Claims, 4 Drawing Sheets

(51) Int. Cl.

| | |
|---|---|
| *A23L 29/212* | (2016.01) |
| *A23L 29/219* | (2016.01) |
| *A21D 13/40* | (2017.01) |
| *A21D 13/043* | (2017.01) |
| *A21D 13/047* | (2017.01) |
| *A21D 8/06* | (2006.01) |
| *A21D 10/00* | (2006.01) |

(52) U.S. Cl.
CPC ......... *A21D 13/043* (2017.01); *A21D 13/047* (2017.01); *A21D 13/40* (2017.01); *A23L 29/212* (2016.08); *A23L 29/219* (2016.08)

(56) References Cited

U.S. PATENT DOCUMENTS

| | | | |
|---|---|---|---|
| 6,168,857 | B1 | 1/2001 | Andersen et al. |
| 2005/0008761 | A1 | 1/2005 | Paulus et al. |
| 2005/0053715 | A1* | 3/2005 | Dolores-Martinez-Serna Villagran ............... A21D 2/362 426/622 |
| 2006/0088647 | A1 | 4/2006 | Kadan et al. |
| 2007/0031564 | A1 | 2/2007 | Fontanesi et al. |
| 2008/0044518 | A1 | 2/2008 | Johnson et al. |
| 2009/0017170 | A1* | 1/2009 | Armstrong ............. A21D 13/22 426/104 |
| 2009/0123627 | A1 | 5/2009 | Shepard et al. |
| 2010/0015279 | A1* | 1/2010 | Zhang .................... A21D 2/183 426/19 |
| 2010/0021610 | A1 | 1/2010 | Fukasawa et al. |
| 2010/0310747 | A1* | 12/2010 | Paulus ................... A21D 13/04 426/549 |
| 2011/0045146 | A1 | 2/2011 | Canty et al. |
| 2011/0281010 | A1 | 11/2011 | Parry et al. |
| 2014/0342045 | A1 | 11/2014 | Mesdag |
| 2014/0370178 | A1* | 12/2014 | Boursier ................. A21D 2/36 426/549 |
| 2015/0004300 | A1 | 1/2015 | Cavalieri Manasse |
| 2015/0140173 | A1 | 5/2015 | Mesdag |
| 2015/0342201 | A1* | 12/2015 | Thomas ............... A21D 13/066 426/549 |
| 2016/0073665 | A1 | 3/2016 | Mohindru |
| 2016/0120191 | A1 | 5/2016 | Dacey et al. |
| 2016/0150798 | A1 | 6/2016 | Dacey et al. |
| 2017/0079287 | A1 | 3/2017 | Rake-Kukic et al. |
| 2018/0116230 | A1 | 5/2018 | Vadlamani et al. |

FOREIGN PATENT DOCUMENTS

| | | |
|---|---|---|
| WO | 2007060549 | 11/2007 |
| WO | 2007062012 | 11/2007 |
| WO | 2007093996 | 4/2009 |
| WO | 2012127215 | 2/2013 |
| WO | 2016210408 | 12/2016 |
| WO | 2017131973 | 8/2017 |
| WO | 2018081369 | 5/2018 |
| WO | 2018081376 | 5/2018 |

OTHER PUBLICATIONS

Mihalos, Cracker tech 101, Bakingbusiness.com, accessed at https://www.bakingbusiness.com/articles/35924-cracker-tech-101#:~:text= The%20lamination%20step%20provides%20strong,%2Darm% 20and%20cut%2Dsheet, 2014 (Year: 2014).*

"Baking Science into Success," retrieved Mar. 13, 2017 from URL <http://web.archive.org/web/20151216015510/http://msdssearch. dow.com/PublishedLiteratureDOWCOM/dh_0943/0901b80380943ab2. pdf?filepath=dowwolff/pdfs/noreg/194-01539.pdf&fromPage= GetDoc>, (12 pages).

Capriles, Vanessa D. et al., "Novel Approaches in Gluten-Free Breadmaking: Interface between Food Sicence, Nutrition, and Health," Comprehensive Reviews in Food Science and Food Safety, Aug. 2014, vol. 13, No. 5 (20 pages).

"Gluten Free White Bread Mix," SalDoce Fine Foods, Dec. 2015, New Zealand, Australia (3 pages).

Horstmann, Stefan et al., "Fundamental Study on the Impact of Gluten-Free Starches on teh Quality of Gluten-Free Model Breads," Foods, Apr. 2016 vol. 5, No. 2 (12 pages).

Howler, R.H. et al., "Cassava, Starch and Starch Derivatives," Proceedings of the International Symposium held in Nanning, Guanxi, China. Nov. 11-15, 1996 (3 pages).

"International Search Report and Written Opinion," for PCT Application No. PCT/US2017/058454 dated Jan. 2, 2018 (16 pages).

Kieffer, R. et al., "Correlations of the Breadmaking Performance of Wheat Flour with Rheological Measurements on a Micro-Scale," Journal of Cereal Science 27 (1998) 53-60 (8 pages).

"White Bread Mix," Coles Simply Gluten Free, Feb. 2015, Australia (3 pages).

Zandonadi, Renata P. et al., "Psyllium as a Substitute for Gluten in Bread," Journal of the American Diatetic Association, Oct. 2009, vol. 109, No. 10 (4 pages).

"International Preliminary Report on Patentability," for PCT Application No. PCT/US2017/058454 dated May 9, 2019 (11 pages).

"International Preliminary Report on Patentability," for PCT Application No. PCT/US2017/058463 dated May 9, 2019 (9 pages).

"Non-Final Office Action," for U.S. Appl. No. 15/791,619 dated Jan. 10, 2020 (18 pages).

"Amylose and Amylopectin," International Starch Institute, accessed at http://www.starch.dk/isi/starch/starch.asp, 1999 (2 pages).

Ams, Bruna et al., "Impact of Heat-Moisture Treatment on Rice Starch, Applied Directly in Grain Paddy Rice or in Isolated Starch," Food Science and Technology 60 (2015) 708-713 (6 pages).

Ceballos, Hernan et al., "Comparison of Pasting and Gel Stabilities of Waxy and Normal Starches from Potato, Maize, and Rice with Those of a Novel Waxy Cassava Starch under Thermal, Chemical, and Mechanical Stress," J. Agric. Food Chem. 2010, 58, 5093-5099 (7 pages).

Fu, Zhen et al., "Developments in Hydroxypropylation of Starch: A Review," Starch—Stärke 2019, 71: 1800167 (10 pages).

Nachay, Karen "Formulating the Perfect Piece of Cake," Feb. 1, 2015, accessed at https://www.ift.org/news-and-publications/ food-technology-magazine/issues/2015/february/columns/ingredients (14 pages).

"Non-Final Office Action," for U.S. Appl. No. 15/791,619 dated Aug. 26, 2020 (21 pages).

Nor, M. Z. et al., "Increasing Resistant Starch Content in Fish Crackers Through Repetitive Cooking-Chilling Cycles," International Journal of Food Properties, 17:5, 966-977 (2014), 13 pages).

"Response to Non-Final Office Action," for U.S. Appl. No. 15/791,619, filed Nov. 25, 2020 (23 pages).

"International Search Report and Written Opinion," for PCT Application No. PCT/US2017/058463 dated Feb. 9, 2018 (12 pages).

* cited by examiner

GLUTEN-FREE COMPOSITIONS AND METHODS FOR PRODUCING SHELF-STABLE BAKERY PRODUCTS

This application claims the benefit of U.S. Provisional Application No. 62/414,056, filed Oct. 28, 2016, the content of which is herein incorporated by reference in its entirety.

FIELD

Embodiments herein relate to gluten-free flour compositions, baked product made using the same, and methods for making shelf-stable crackers, and other bakery products.

BACKGROUND

The gluten-free market is a global trend and currently estimated to be $3.2 billion worldwide. The term "gluten-free" has been defined by the U.S. Food and Drug Administration (FDA) as meaning that the food either is inherently gluten-free; or does not contain an ingredient that is: 1) a gluten-containing grain (e.g., spelt wheat); 2) derived from a gluten-containing grain that has not been processed to remove gluten (e.g., wheat flour); or 3) derived from a gluten-containing grain that has been processed to remove gluten (e.g., wheat starch), if the use of that ingredient results in the presence of 20 parts per million (ppm) or more gluten in the food. As such, in the context of a baked product such as a cracker, a food product can be considered "gluten-free", as long as the gluten content in the product is below 20 ppm.

Less than 1% of the US population has been diagnosed with celiac disease and another 6% are non-celiac gluten-sensitive, for which the only treatment is a gluten-free diet. However, beyond the more limited number of people with specific medical concerns, consumers are seeking gluten-free foods because they are being perceived as being healthier, which increases the buying public to about 25%.

Gluten is a functional protein found in wheat, rye, barley, spelt, kamut, and triticale (a crossbreed of wheat and rye) grains. Gluten is essential for dough functionality in baked products, as it contributes to extensibility, mix tolerance, gas-holding capacity, and structure.

Gluten-free baked products are difficult to formulate and achieve properties similar to their wheat-based counterparts. Several technical challenges include poor machinability, dense loaf volume, gritty/brittle texture, shorter shelf life, and undesirable flavor.

SUMMARY

Embodiments herein include a cracker flour substitute composition can include a starch blend including a native starch with 20-30% amylose content, a cross-linked starch and a pre-gelatinized starch with 1-5% amylose content. The composition can include between 0 and 20 ppm gluten.

In an embodiment, a shelf-stable baked cracker is included. The shelf-stable baked cracker can include a flour substitute composition including a starch blend having a native starch with 20-30% amylose content, a cross-linked starch, and a pre-gelatinized starch with 1-5% amylose content. The composition can include between 0 and 20 ppm gluten.

In an embodiment, a method of making a shelf-stable cracker product is included. The method can include mixing a cracker flour substitute composition with water to form a dough. The cracker flour substitute composition can include a starch blend including a native starch with 20-30% amylose content, a cross-linked starch, and pre-gelatinized starch with 0-1% amylose content. The composition can include between 0 and 20 ppm gluten. The method can also include fermenting the dough, laminating and sheeting the dough, cutting the sheeted dough into a desired shape and baking the dough to a finished product.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope herein is defined by the appended claims and their legal equivalents.

BRIEF DESCRIPTION OF THE FIGURES

Aspects may be more completely understood in connection with the following drawings, in which.

Figure 1:
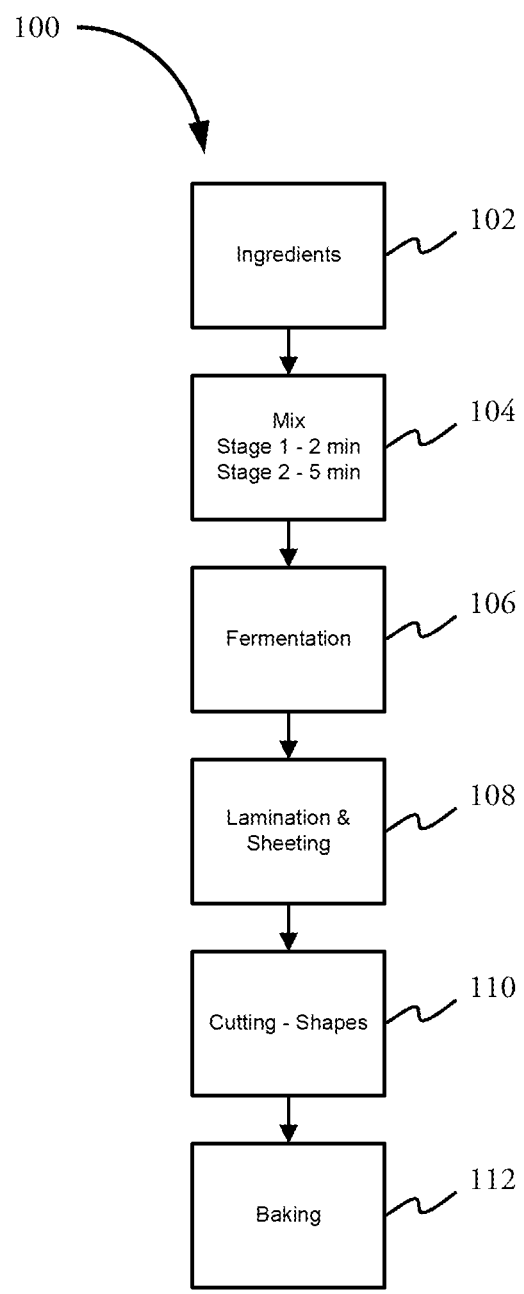
FIG. 1 is a flow chart of a process for making a gluten-free cracker in accordance with various embodiments herein.

While embodiments are susceptible to various modifications and alternative forms, specifics thereof have been shown by way of example and drawings, and will be described in detail. It should be understood, however, that the scope herein is not limited to the particular embodiments described. On the contrary, the intention is to cover modifications, equivalents, and alternatives falling within the spirit and scope herein.

DETAILED DESCRIPTION

The embodiments described herein are not intended to be exhaustive or to limit the invention to the precise forms disclosed in the following detailed description. Rather, the embodiments are chosen and described so that others skilled in the art can appreciate and understand the principles and practices.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

As referenced above, the market for gluten-free foods is quite substantial. Gluten-free baked products typically exhibit poor machinability, dense and hard texture, gritty mouthfeel, and undesirable flavor.

As such, there is a substantial unmet need in the industry for gluten-free cracker formulations that process well on traditional lines for producing crackers with great taste, and great texture.

Embodiments herein include identifying and selecting a group of starches from a variety of sources with a specific chemical makeup (amylose/amylopectin content) and specific functional properties and then combining those starches in unique proportions to deliver on targeted functionality.

As used herein, the term "shelf stable" with reference to a cracker product is defined as a cracker that is packed under normal packaging conditions and can be stored at room temperature for at least 180 days.

Starch

Starch consists of two kinds of glucose polymers (amylose and amylopectin). Depending on the plant, starch generally contains 20-25% amylose and 75-80% amylopectin. In general, grain-derived starches have a higher amylose content than tuber-derived starches.

Amylose is an essentially a linear molecule, consisting of α-(1,4)-linked D-glucopyranosyl units with a degree of polymerization (DP) in the range of 500 to 6,000 glucose residues. Table 1 below shows the amylose content and granule size of various starches.

TABLE 1

Amylose Content and Granule Size of Various Starches

| Starch Source | % Amylose | Granule Size Range (μm) | Average Size (μm) |
|---|---|---|---|
| Waxy Rice | 0 | 2-15 | 6 |
| High Amylose Corn | 70 | 4-20 | 10 |
| Corn | 28 | 5-25 | 14 |
| Cassava | 17 | 3-30 | 14 |
| Waxy Sorghum | 0 | — | — |
| Wheat | 26 | 3-35 | 7 and 20 |
| Sweet Potato | 18 | 4-40 | 19 |
| Arrowroot | 21 | 9-40 | 23 |
| Sago | 26 | 15-50 | 33 |
| Potato | 20 | 10-100 | 36 |

In contrast to amylose, amylopectin is a very large, highly branched chain molecule with a DP ranging from $3 \times 10^5$ to $3 \times 10^6$ glucose units and consists of α-(1,6)-linked D-glucopyranosyl units attached to α-(1,4)-bonds. However, starches of some particular genotypes of maize, barley, rice, and wheat etc. contain either an increasing amylose content (i.e. amylostarch up to 70% amylose) or an increasing amylopectin content (i.e. waxy starch with 99-100% amylopectin). Table 2 below shows the ratio of amylose and amylopectin in some starches. Table 3 below shows the characteristics of some starch granules.

TABLE 2

Ratio of amylose and amylopectin in some starches

| Source | Amylose (%) | Amylopectin (%) |
|---|---|---|
| potato | 21 | 79 |
| maize | 28 | 72 |
| wheat | 26 | 74 |
| tapioca | 17 | 83 |
| waxy maize* | — | 100 |

TABLE 3

Characteristics of some starch granules

| Starch | Type | Size of Grain (in μm) | | Shape |
| | | Range | Average | |
|---|---|---|---|---|
| potato | tuber | 5-100 | 40 | oval spherical |
| maize | grain | 2-30 | 15 | round polygonal |
| wheat | grain | 1-45 | 25 | round lenticular |
| tapioca | root | 4-35 | 25 | oval truncate |
| waxy maize | grain | 3-26 | 15 | round polygonal |

The role of starch in staling of bakery products has been studied extensively. Staling is usually characterized as toughening of the crust, firming of the crumb, loss of moisture and flavor, and corresponding loss in product freshness. As to the two types of starch components, amylose is considered to be primarily responsible for gel structure and crystallinity, while amylopectin is responsible for long-term rheological and structural changes of gels. Therefore, amylose is considered to be primarily responsible for staling in baked products. The amylose content affects firmness of starch gels. The higher the amylose content the firmer the gel and vice versa. On the other hand, amylopectin contributes to a softer gel by slowing the gel formation.

Cross-linking is a common modification method used to improve the performance of native starches. Cross-linking reinforces the granules of starch to be more resistant to degradation from pH, heat, and shear. Cross-linking tends to help with slowing the retrogradation rate.

Pre-gelatinized starches are the starches that are cooked and dried using a drum dryer, extruder, or spray dryer. These starches are cold water soluble and provide viscosity without the need for cooking or higher temperatures. Pre-gelatinized starch(es) used herein can be a combination of waxy and non-waxy starches where the amylose content can be from about 0.1% up to 1%, 2%, 3%, 4% or 5%.

Amylose Content and Amylose to Amylopectin Ratios

As applied to cracker flour embodiments, the starch blend is selected to have about 10, 11, 12, 13, 14, 15, 16, 17, 18, 19, 20, 21, 22, 23, or 24 percent by weight of amylose. The starch blend can have a range of amylose content wherein any of the foregoing percentages can serve as the upper or lower bound of the range, provided that the upper bound is larger than the lower bound. In some embodiments, the starch blend can have an amount of amylose from about 14 to 20%. In some embodiments, the starch blend can have an amount of amylose from about 16 to 18%.

As applied to cracker flour embodiments, the components of the starch blend can be selected to have a specific ratio of amylose to amylopectin. In some embodiments, the range can be from 1:2 to 1:5. In some embodiments, the range can be from 1:3 to 1:4. In some embodiments, the ratio of amylose to amylopectin can be about 1:3.5.

Cracker Flour

Embodiments of cracker flour herein can include a starch component that is a combination of native starch, pre-gelatinized starch, and modified (cross-linked) starch.

Embodiments of methods of making gluten-free cracker flour can include: selecting sources of native starch, pre-gelatinized starch, and modified (cross-linked) starch and combining them in unique proportions to deliver a targeted amylose content and amylose/amylopectin ratios.

Embodiments herein for the gluten-free cracker flour composition include a starch blend comprising from a selective group of starches: (a) a native starch with 20-30% amylose content, (b) a modified (cross-linked) starch, and (c) pre-gelatinized starch(es) with amylose content of 1-5%.

In an embodiment, the native starch content can be about 40%, 45%, 50%, 55%, 60%, 65%, 70%, 75%, or 80% of the gluten-free cracker flour composition. In various embodiments, the native starch content can be in a range wherein any of the foregoing percentages can serve as the upper or lower bound of the range, provided that the upper bound is greater than the lower bound.

In various embodiments, the modified (cross-linked) starch content can be about 5, 10, 20, 25, 30, 35, 40, 45, or 50% of the total gluten-free cracker flour composition. In some embodiments, the modified (cross-linked) starch content can be in a range wherein any of the foregoing numbers can serve as the upper or lower bound of the range. In an embodiment, the modified (cross-linked) starch content can be up to 10%, 15%, 20%, 25%, 30%, 35%, or 40% of the total gluten-free cracker flour composition.

In an embodiment, the pre-gelatinized starch(es) content can be about 5, 10, 15, 20, 25, or 30% of the total gluten-free cracker flour composition. In some embodiments, the pre-gelatinized content can be in a range wherein any of the foregoing numbers can serve as the upper or lower bound of the range, provided that the upper bound in greater than the lower bound. In some embodiments, the pre-gelatinized starch content can vary up to 10%, 15%, and 20% of the total gluten-free cracker flour composition.

Other Components

Other components of gluten-free cracker flour, or other types of flours can include, but are not limited to:

Tapioca flour, rice flour, sorghum flour, waxy sorghum flour, millet flour, potato flour, buckwheat flour, or combination thereof.

Hydrocolloids including, but not limited to, xanthan gum, carrageenan, guar gum, microcrystalline cellulose, or a combination there of.

Insoluble fibers including, but not limited to, sugarcane fiber, wheat bran, oat fiber, etc.

Protein ingredients including, but not limited to, dried egg proteins, whole egg proteins, non-fat dry milk, milk protein concentrate, caseinates, whey protein, soy protein etc.

Sweeteners including, but not limited to, sugar, glucose, fructose, maltose, maltodextrins, high fructose corn syrup, malt syrup, grain syrups such as sorghum syrup etc.

Other optional ingredients such as liquid oils (canola, soy, etc), butter, salt, sugar, yeast (active and dry), nuts, seeds, dried fruits, and inclusions.

Cheese ingredients for crackers can include, but are not limited to, variations of cheddar cheese (mild, medium, sharp), parmesan cheese, cheese powders, cheese flavors, etc.

Leavening agents including, but not limited to, sodium bicarbonate and ammonium bicarbonate.

Flavor enhancers including, but not limited to, monosodium glutamate, inactive dry yeast.

Food coloring agents including both natural and artificial colors.

Methods of Producing Gluten-Free Bakery Products

Included herein are the methods of making gluten-free products, including but not limited to gluten-free crackers.

In some embodiments of gluten-free cracker, a step of selecting specific starch ingredients and combining them in desired proportion to a target amylose content of 16-18% and amylose: amylopectin ratios of 1:3.5 can be included. The method can include further combining starch blend with other ingredients and mixing them into a dough of desired consistency. The dough consistency can be measured using a texture analyzer such as a Kieffer Dough Extensibility Rig as described herein. For example, gluten-free cracker dough will have stiffer consistency (Rmax, E and Rmax/E values of 64 g, 5.5 mm, and 11.6 respectively). One advantage of this gluten-free cracker dough is its consistency, which allows it be processed on traditional/non-traditional cracker manufacturing lines. The dough can be further fermented, laminated, sheeted, cut, and baked.

Aspects of a method 100 for making a gluten-free crackers in accordance with various embodiments herein are shown in the flow chart of FIG. 1. The method of making a gluten-free cracker can include an operation of obtaining ingredients 102 (as described herein). The ingredients can then be mixed 104 in another operation. In various embodiments, the mixing can occur in stages. By way of example, in some embodiments, there can be a first stage of mixing and a second stage of mixing. The first stage of mixing can include the premixing of dry ingredients, oil, cheese, and other optional ingredients at a slower speed. The first stage of mixing further include addition of water and mixing at a slower speed until dough starts to form into a cohesive mass. In some embodiments, the first stage of mixing can last from about 10 seconds to about 5 minutes. In some embodiments, the first stage of mixing can last about 2 minutes. In second stage of mixing, the mixing is done at relatively high speed allowing full hydration of dry ingredients and completely developing dough cohesive network. In some embodiments, the second stage of mixing can last from about 2 minutes to about 10 minutes. In some embodiments, the second stage of mixing can last about 5 minutes.

In some embodiments, the method of making a gluten-free cracker can also, optionally, include an operation of fermentation 106. During the process of fermentation 106, the dough recipe will have 0.5-1% active yeast included in the formulation. The cracker dough will be mixed to a dough temperature of 90-95° F. and allowed to ferment for 4-24 hours at room temperature. Fermentation is carried out preferably for 4-6 hours. During fermentation, the temperature of the dough could rise to 105-110° F. due to yeast activity.

In some embodiments, the method of making a gluten-free cracker can also include an operation of lamination and sheeting 108. During the process of lamination and sheeting 108, the dough is first passed through laminator, where dough is formed into a continuous sheet and 2-4 layers gets over-layed through a folding process. Then, these continuous layered sheets are passed through a set of reduction rolls and the sheet thickness is reduced to a desired thickness of 0.5-1 mm.

In some embodiments, the method of making a gluten-free cracker can also include an operation of cutting and/or shaping 110. During the process of cutting and/or shaping 110, a rotary cutter with desired shapes is used to cut the sheeted dough and the cut raw crackers are transferred to baking oven. The rotary cutter can have the capability of imprinting one shape or multiple shaped crackers.

The method of making a gluten-free cracker can also include an operation of normal baking 112. Baking 112 can include baking the dough at a temperature of about 325, 350, 400, 425, 450, 500, 550° F. (or in a range between any of the foregoing temperatures) for about 3, 5, 7, 9, 11, 13, 15 minutes (or in a range between any of the foregoing times).

Figure 4:
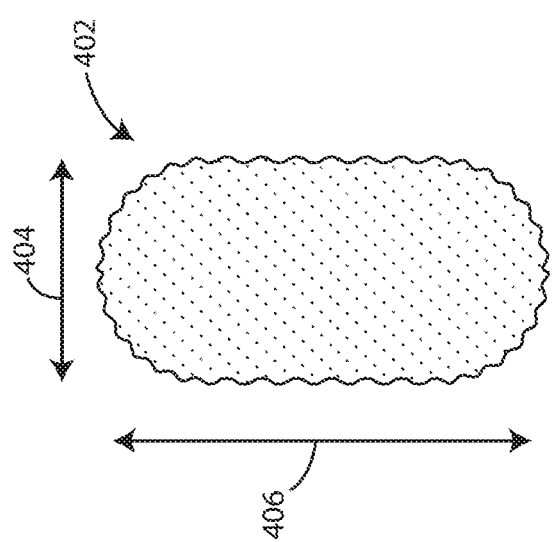
FIG. 4 is a schematic view of a gluten-free baked cracker product in accordance with various embodiments herein.

Baked products herein can include crackers of various types as well as other type of baked products. Referring now to FIG. 4, a schematic view is shown of a baked cracker 402 in accordance with various embodiments herein. The baked product 402 has a length 406 and a width 404. The length 406 can vary but in some embodiments can be about 0.5, 1, 1.5, 2, 2.5, 3, 3.5, 4, 4.5 or 5 inches, or in a range wherein any of the foregoing lengths can serve as the upper or lower bound of the range provided that the upper bound is greater than the lower bound. The width 404 can also vary but in some embodiments can be about 0.5, 1, 1.5, 2, 2.5, 3, 3.5, 4, 4.5 or 5 inches, or in a range wherein any of the foregoing widths can serve as the upper or lower bound of the range provided that the upper bound is greater than the lower bound. The overall profile of the baked product 402 can take various forms including a circular, square, polygonal, ovoid, or the like.

Figure 5:
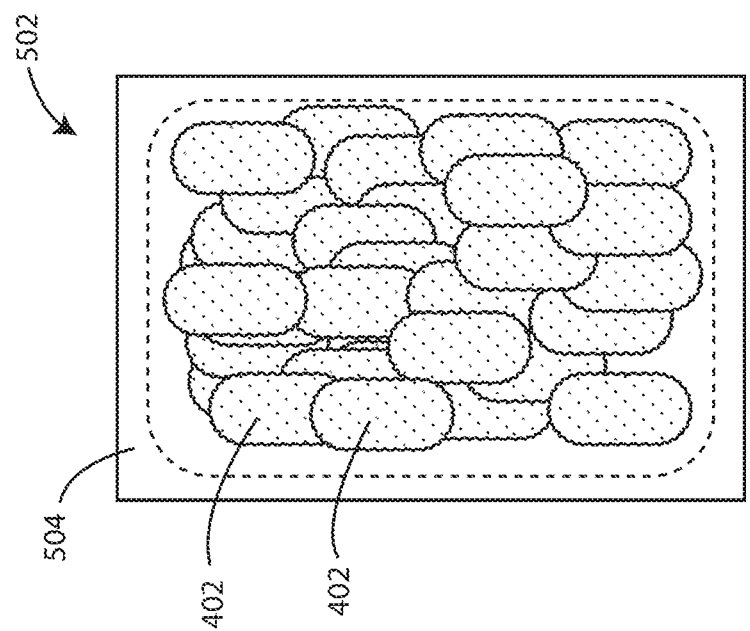
FIG. 5 is a schematic view of a gluten-free baked cracker product in accordance with various embodiments herein.

In some embodiments, multiple crackers (or baked products) can be disposed within a package, such as a polymeric package or pouch. In various embodiments herein, the packaging is not modified-atmosphere packaging (MAP). Referring now to FIG. 5, a schematic view is shown of a product 502 including baked products 402 disposed within a polymeric package 504.

Dough Rheology

Dough rheology can be measured by several instruments. For example, the gluten-free dough rheological properties are measured using the Kieffer Dough and Gluten Extensibility Rig on the Texture Analyzer according to the method of Kieffer et al., *Correlations of the breadmaking performance of wheat flour with rheological measurements on a microscale*, Journal of Cereal Science, 27: 53-60 (1998).

The measurements of dough rheology can include: $R_{max}$ (resistance to extension, g), E-extensibility until dough rupture (mm), and ratio of Rmax/E (measure of dough relative firmness). Aspects of dough rheological measurement curves are show in FIGS. 2A-2B.

In embodiments here in, the optimized gluten-free cracker doughs have resistance to extension (Rmax), extensibility (E), and Rmax/E values of 64 g (48-80 g), 5.5 (4.5-6.5 mm) mm, and 11.6 (8-16), respectively.

Cracker Texture

Figure 3:
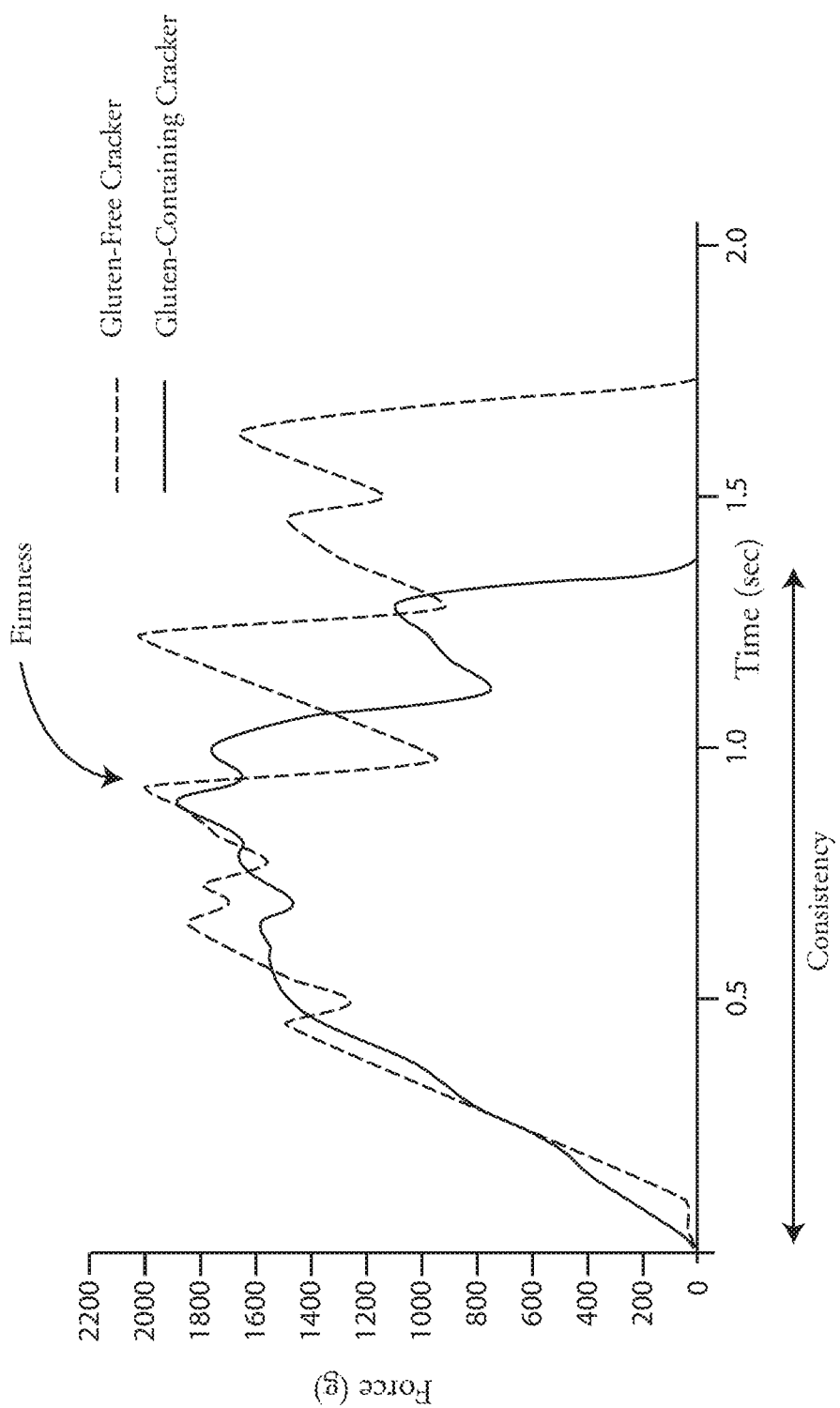
FIG. 3 is a graph of typical fracturability curves for gluten-containing crackers and gluten-free crackers.

Cracker texture can be characterized by through a fracturability test. The fracturability of a cracker is the tendency of a cracker to fracture, crumble, crack, shatter or fail upon the application of a relatively small amount of force or impact. It is usually displayed by a product with a high degree of hardness and a low degree of cohesiveness. Fracturability of gluten-free crackers can be measured using a texture analyzer, according to the method recommended by Texture Technologies Ltd. A cylindrical probe is used to compress the crackers at a rate of 1 mm/sec and 20% strain until they fracture. The force required to fracture is measured. The lower the force required to fracture, the tenderer the bite of a cracker. Aspects of cracker fracturability curves are shown in FIG. 3.

In embodiments herein, the optimized gluten-free crackers have firmness (peak force) of about 1700 to 2900 g, or about 2300 g and consistency of about 1.2 to 2.2 s, or about 1.65 s; values that are comparable to firmness (1500 g) and consistency (1.65 s) of a gluten-containing cracker.

Further Embodiments

Embodiments herein include gluten-free cracker flour compositions and methods for making shelf stable gluten-free crackers, bakery products, and baked snacks.

In an embodiment, the "gluten-free cracker flour" composition consists of a starch blend comprising from a selective group of starches: (a) a native starch with 20-30% amylose content, (b) a modified (cross-linked) starch, and (c) pre-gelatinized starch(es) with amylose content of 1-5%.

In an embodiment, the starch components are blended in desired proportions to a target amylose content of 16-18% and an amylose: amylopectin ratio of 1:3.5. In an embodiment of the 'gluten-free cracker flour", the native starch content varied from 40-80%, modified (cross-linked) starch from 10-40%, and pre-gelatinized starch(es) from 10-20%.

In an embodiment, the native starch used in the "gluten-free cracker flour" can be from a selective group: wheat starch (gluten-free), corn, potato, rice, tapioca and combination thereof.

In an embodiment, the preferred native starch is potato starch.

In an embodiment, the modified (cross-linked) starch can be selected from the group of corn, potato and combination thereof.

In an embodiment, the pre-gelatinized starch(es) can be a blend of both waxy/non-waxy varieties from a selective group: corn, potato, rice, tapioca, or combination thereof.

In an embodiment, the optional ingredients such as cheese, oil, salt, sugar, yeast, leavening agents, spice blend.

In an embodiment, the method involves mixing "gluten-free cracker flour" and optional ingredients with water to a desired consistency to a formable dough. The method includes further steps of laminating and sheeting, cutting to desired shapes, and baking to a finished product.

Aspects may be better understood with reference to the following examples. These examples are intended to be representative of specific embodiments, but are not intended as limiting the overall scope of embodiments herein.

EXAMPLES

Example 1

Gluten-Free Cracker Formulations

A typical "gluten-free cracker flour" composition is as follows:

| Gluten-free Cracker Flour Composition | % by Weight |
|---|---|
| Native Starch | 40-80 |
| Modified (cross-linked) Starch | 10-40 |
| Pregel Starch Blend with 1-5% amylose | 10-20 |
| Total | 100% |

In this example, a cheese cracker was baked with gluten-free cracker flour composition containing 17% amylose. Optional ingredients in the formulation include: medium aged cheddar cheese, oil, salt, yeast, seasoning, leavening agents (sodium bicarbonate, ammonium bicarbonate) and water. The ingredients were mixed into a dough, laminated, and sheeted to a desired thickness, cut into desired shape and baked at 475° F. for 3 minutes and at 345° F. for 8-10 minutes. The product was cooled, coated with additional oil and salt.

Example 2

Rheological Properties of Gluten-Free Cracker Dough

Figures 2A, 2B:
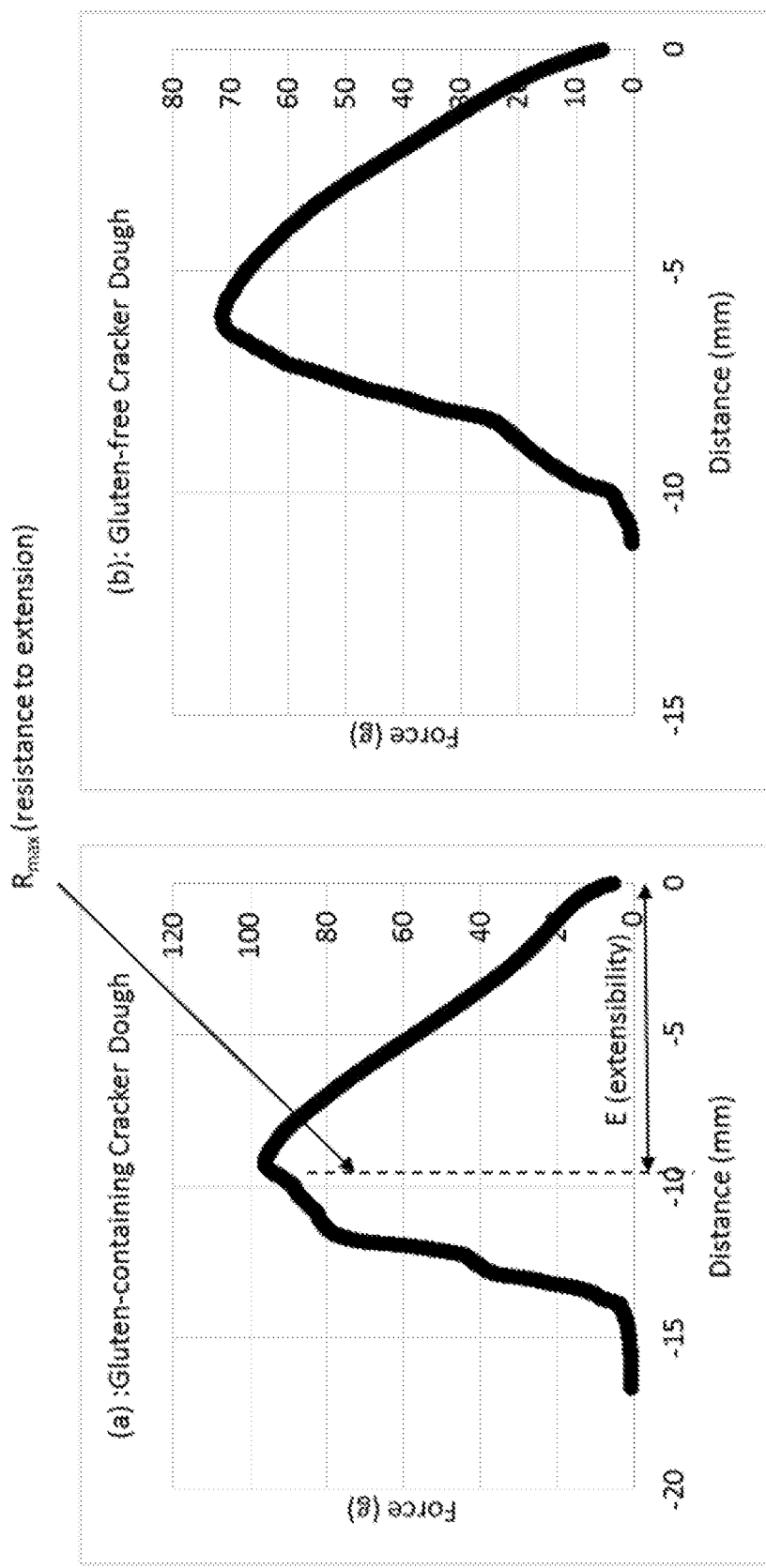
FIGS. 2A-2B are graphs of typical Keiffer extensigraph curves for gluten-containing cracker dough (2A) and gluten-free cracker dough (2B).

In this example, the rheological properties of gluten-free cracker dough were measured using the Kieffer Dough and Gluten Extensibility Rig on the Texture Analyzer according to the method of Keiffer et al.(Correlations of the breadmaking performance of wheat flour with rheological measurements on a microscale, Journal of Cereal Science, 1998 27: 53-60). Control doughs (gluten-containing) were also prepared for rheological measurements. The dough strips were prepared by placing the dough in Teflon block and rested for 15-20 minutes. The measurements were made with hook probe at a speed of 3.3 mm/sec. The measurements recorded include: $R_{max}$(resistance to extension, maximum force g) and extensibility until dough rupture to (extensibility -E, mm). A typical extensibility curve for gluten-free cracker dough and a control cracker dough are shown in FIGS. 2A-2B.

The typical gluten-free cracker dough has relatively lower resistance to extension (64 g vs 114 g) and lower extensibility (5.5 mm vs 12.2 mm).

| Product | Resistance to Extension $R_{max}$ (g) | Extensibility- E(mm) | $R_{Max}/E$ |
|---|---|---|---|
| Cracker Dough | | | |
| Control | 114 | 12.2 | 9.3 |
| Gluten-Free | 64 | 5.5 | 11.6 |

Example 3

Fracturability of Gluten Free Crackers

In this example, gluten-free cheese crackers made as per example 1 were used for measuring the texture. Fracturability of gluten-free cheese crackers was measured using a texture analyzer, according to the method recommended by Texture Technologies Ltd. A cylindrical probe was used to compress the crackers at a rate of 1 mm/sec and 20% strain, until they fracture. The force required to fracture was measured. The lower the force required to fracture, the tender bite of a cracker.

The baked gluten-free crackers have a tender bite (firmness and consistency) similar to that of control gluten-containing crackers as indicated by fracturability curves in FIG. 3.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this invention pertains. All publications and patent applications are herein incorporated by reference to the same extent as if each individual publication or patent application was specifically and individually indicated by reference.

Aspects have been described with reference to various specific and preferred embodiments and techniques. However, it should be understood that many variations and modifications may be made while remaining within the spirit and scope herein.

The invention claimed is:

1. A method of making a shelf-stable cracker product comprising:
   mixing ingredients consisting of a cracker flour substitute composition and water to form a dough, the cracker flour substitute composition consisting of
      a starch blend consisting of
         a native starch with 20-30% amylose content;
         a cross-linked starch comprising a corn starch, a potato starch, or a combination thereof; and
         pre-gelatinized starch with 0-1% amylose content
      the cracker flour composition including between 0 and 20 ppm gluten;
   fermenting the dough;
   laminating and sheeting the dough;
   cutting the sheeted dough into a desired shape; and
   baking the dough to a finished shelf-stable cracker product;
   the starch blend having an amylose content of 16 to 18 wt. %;
   the starch blend having an amylose:amylopectin ratio of 1.0:3.0 to 1.0:4.0.

2. The method of claim 1, wherein the cross-linked starch is present in an amount of from 5% to 50% of the total flour substitute composition.

3. A method of making a shelf-stable cracker product comprising:
   mixing ingredients consisting of a cracker flour substitute composition and water to form a dough that has a resistance to extension (Rmax) value of from 48 g to 80 g, an extensibility (E) value of from 4.5 mm to 6.5 mm, and Rmax/E value of from 8 to 16, the cracker flour substitute composition consisting of
      40 to 80 wt. % of a native starch with 20-30% amylose content;
      10 to 40 wt. % of a cross-linked starch comprising a corn starch, a potato starch, or a combination thereof; and
      10 to 20 wt. % of a pre-gelatinized starch with 1-5% amylose content;
      the cracker flour substitute composition including less than 20 ppm gluten;
   fermenting the dough;
   laminating and sheeting the dough;
   cutting the sheeted dough into a desired shape; and
   baking the dough to a finished shelf-stable cracker product;
   the starch blend having an amylose content of 17 wt. %; and
   the starch blend having an amylose:amylopectin ratio of 1.0: 3.5.

* * * * *